Feb. 20, 1968    W. L. HOCHNER ET AL    3,369,962
DECORATED OVERLAY FOR MOLDED ARTICLES
Filed Dec. 9, 1963    2 Sheets-Sheet 1

Conventional Overlay
Printed Side

Conventional Resin Coating on Conventional Overlay

Printed Side

Invention Coating Reacted With Top Portion Only of Conventional Overlay

Printed Side

INVENTORS
Walter L. Hochner
Winthrop S. Lawrence
George T. Brown
BY Connolly and Hutz
ATTORNEYS

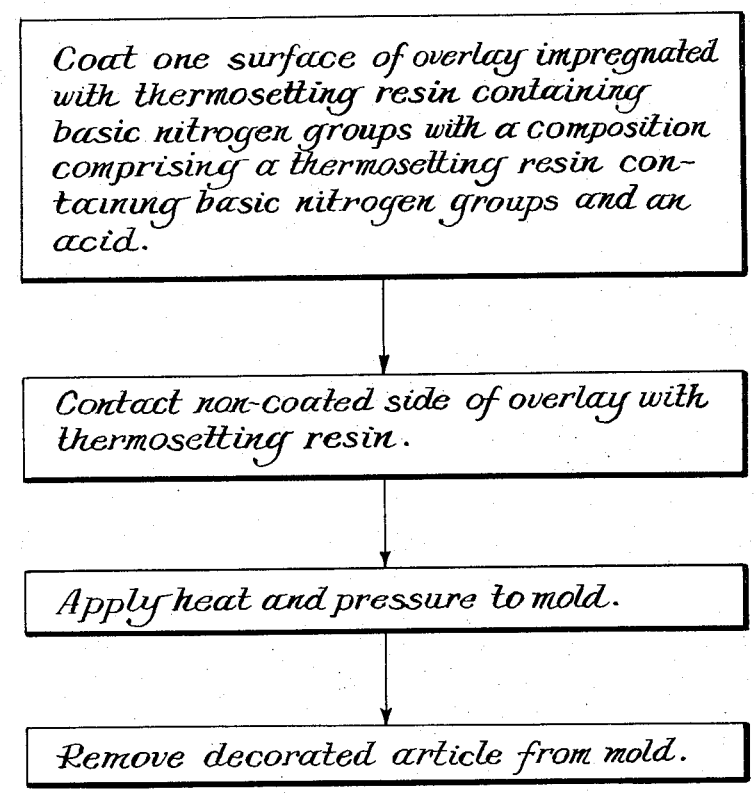

3,369,962
DECORATED OVERLAY FOR MOLDED ARTICLES

Walter L. Hochner, Wilmington, Del., Winthrop S. Lawrence, Lincoln University, Pa., and George T. Brown, Kiamensi Gardens, Wilmington, Del., assignors to Kaumagraph Company, Wilmington, Del., a corporation of Delaware
Filed Dec. 9, 1963, Ser. No. 329,067
7 Claims. (Cl. 161—258)

This invention is directed to a novel method of producing a decorative surface on a plastic article. More specifically, the invention relates to an improved decorative overlay for application to a thermosetting resin molding material for the preparation of designs on molded articles and laminates.

A long-recognized difficulty in the plastic article field has involved the inability to apply a good decorative design to the plastic. The general process disclosed in the prior art for affixing a decorative design to plastic is illustrated in U.S. Patents Nos. 2,646,380, 2,760,899, and 2,797,180. This is essentially a two-step molding process. In the first step, a charge of, e.g., melamine-formaldehyde molding powder is placed in the lower half of a mold corresponding in size and shape to that of the article to be formed, and the upper half of the mold is then lowered sufficiently to close the mold. Sufficient heat and pressure are applied to powder in this manner to form a partially cured "preform" in about 30 seconds. For the second step, the mold is now opened and a decorated foil or overlay is laid over the preform in the mold. This foil is a flat sheet of thin, fibrous material such as paper which is impregnated with a partially cured resin of the same type as that in the preform, e.g., melamine-formaldehyde, and bears the necessary design. The mold is now closed again and sufficient pressure and heat applied to complete molding within about two minutes. During this second step, the resin content of the foil fuses with the partially condensed resin in the preform so as to permanently integrate the printed foil with the surface of the molded article. At the completion of this second step of molding, the mold is opened and the finished product removed. Preferably, the paper is applied with the ornamented face down, and reliance is placed upon the circumstance that the paper becomes almost wholly transparent, hence invisible, during the curing and integration procedure, so that the design is clearly visible through the foil.

In the manufacture of decorative laminates numerous layers of pre-impregnated paper stock are sandwiched together, the top sheet being a clear sheet placed directly over a decorated sheet, the entire sandwich being pressed together under heat and pressure. The art for making the plastic articles and the laminate is well known and need not be further discussed. Decorative laminates today are sold under numerous trade names, one of the most prominent being "Formica." Plastic articles are also sold under numerous names as dictated by their manufacturers.

The decorated materials produced by the conventional processes such as those mentioned above are subject to certain serious objections. The principle objections are the relatively poor stain resistance, relatively poor scratch resistance and also unacceptable gloss.

Our invention relates to a method that drastically improves the appearance, stain resistance, and hardness of a molded plastic article. Much attention has been given to the problem over the past several years. In theory, the way to overcome the above enumerated objections is to create a resin-rich surface on the top of the molded article or laminate, or to modify the top side of an impregnating sheet so as to reduce the flow during molding resulting in a high gloss, where the fibers of the paper are sealed in resin and to do this without impairing the hardness and scratch resistance that is inherent in plastic articles molded without a decorative foil. This must be accomplished without impairing the printing surface which must retain its ability to take up ink and become adhesive in molding to attach well to the surface of the partially cured preform.

In theory, the simplest way to accomplish increased surface gloss, hardness, and stain resistance is to apply a resin-rich surface to the plastic overlay; and to make sure that this coating stays on the surface of the overlay during coating, resin advance, and molding. In other words, if a conventional plastic overlay is dusted with an excess of resin or sprayed with a resin, during molding this extra resin actually becomes embedded within the structure of the overlay itself and very little remains on the surface, the reason for this being that the resin has a high degree of flow and molding pressures are upwards at 2,500 p.s.i. Positive methods must be taken to assure that this coating is firmly attached on the surface and will stay there during its preparation and molding.

The prior art has made numerous attempts to overcome the above enumerated objections. Illustrative approaches have been to use a glaze resin applied as a third cycle during the molding operation. The resulting product has a high luster, but since an added cycle is required, a large amount of added expense and time is involved. Furthermore, the glaze resin has a tendency to craze during continued usage of the produce. Another approach is to use a highly catalyzed resin which maintains the resin on the surface during molding by the high catalyst concentration preventing flow. This approach, however, requires the use of expensive catalysts and the shelf life stability of the overlay product is very poor.

The present invention has as its object, therefore, the production of a decorative overlay material which is not subject to the prior art objections. Another object is the production of finished molded and laminated articles which have exceptional gloss, stain resistance and scratch resistance.

An additional object is the production of a coating composition which can be applied to a conventional overlay material which creates a high amount of surface retention of the resin. A further object is to lower the flow during molding of the article. Additionally, it is an object to produce a coating material which has a long shelf-life. It is moreover an object of this invention to produce a resin-rich surface on an overlay paper.

It is further an object to produce a coating composition which when applied to a resin impregnated overlay sheet will react with the top portion only of the overlay sheet and which will not effect the uncoated side.

These and other objects of our invention are accomplished by a method comprising reacting an acid material with the basic thermosetting resin present in both the coating composition used and impregnated in the overlay. The reaction product produces an infusible nonflowing resin-rich surface which remains firmly attached during coating, resin advance and molding, and serves to modify the top portion of the impregnated overlay while not adversely affecting the under surface which goes against the preform in subsequent molding operations. The coating composition used to effect the reaction comprises an acid material and a thermosetting resin containing basic nitrogen groups. This coating composition is preferably of relatively high viscosity so that by its viscous nature it maintains the resin firmly bonded on the surface of the overlay during application.

With this coating, the coating material merely lies on top of the overlay and a definitive separation point between the coating and the paper exists.

Figure 1:
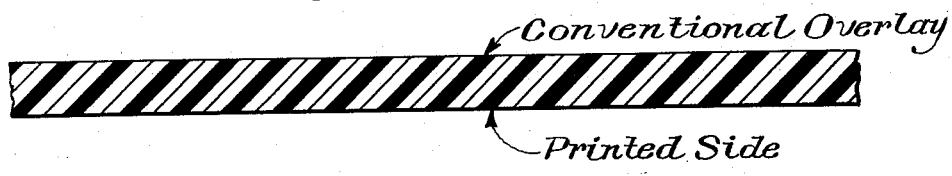
FIGURE 1 depicts a conventional overlay material (e.g. melamine impregnated α-cellulose/rayon blend).
Figure 2:
FIGURE 2 depicts the same conventional overlay material which has a conventional coating (e.g. glaze resin).
Figure 3:

FIGURE 3 depicts the invention coating on the same conventional overlay. With this coating, the coating material has actually reacted with a part of the resin impregnated in the overlay and the top portion of the overlay sheet has thereby been modified. The bottom portion of the overlay sheet, however, has not been modified. This is important since the bottom portion which goes against the preform must be unchanged so that the decorated overlay will properly adhere.

The inventive coating composition which accomplishes the above described objects comprises an acidic material, a resin which contains basic nitrogen groups and, optionally, solvent (e.g. water), a catalyst, an amine and a thickening agent. The nature of these materials is more fully described below.

The resin

As described above, conventional molding operations with decorative overlays involve the application of a resin impregnated overlay sheet to a molded preform and subsequent application of heat and pressure. The resin impregnated in the overlay sheet may be the same resin as the preform. In the inventive coating composition there is also used resin which may correspond to the resin impregnated in the sheet and the resin used in the preform. On the other hand the resin in the preform or impregnated in the sheets used for lamination may be any thermosetting resin and may differ from both the resin impregnated in the overlay and the resin contained in the coating composition. The resin in the coating composition may in turn differ from the resin impregnated in the overlay and all three resins may be the same or different. It is of course understood that since no reaction occurs in the preform per se, the thermosetting resin used in the preform need not contain basic nitrogen groups but may be any thermosetting resin. It is only the thermosetting resin present in the coating composition or overlay that must contain basic nitrogen groups. In order for the desired reaction to occur in the coating composition and overlay to effect the objects of the invention, it is required that these two resins contain basic nitrogen groups. Therefore, any thermosetting resin which contains basic nitrogen groups capable of reacting with acidic material has application in this invention.

Suitable resins therefore are, for example, the condensation products of aldehydes and aminotriazines, condensation products of aldehydes with urea, thiourea, substituted ureas and thioureas and the like, amino substituted phenol-aldehyde resins, amino substituted styrene resins, etc. Mixtures of the above illustrative resins can be used as well as polymers of mixtures of three or more individual monomers. Particularly preferred resins are the aldehyde-aminotriazine resins, e.g. melamine-formaldehyde resin. Other suitable resins of this type are described below.

As suitable aldehydes used to produce the basic resins there may be mentioned formaldehyde, acetaldehyde, propionaldehyde, butyraldehyde, benzaldehyde, furfural, mixtures thereof or compounds engendering aldehydes, e.g. paraformaldehyde, paraldehyde, etc.

As suitable aminotriazines there may be mentioned amino-s-triazines such as 2 - mono-substituted-amino-4, 6-diamino-s-triazines wherein the substituent is for example N-methyl, N-butyl, N-phenyl, N-tolyl, N-cyclohexyl, etc.; 2,4,6-tris (mono substituted amino)-s-triazines such as 2,4,6-tris (methylamino)-s-triazine; the methylolmelamines such as mono methylolmelamines; hydrazino-s-triazines such as 2,4,6 - trihydrazino-s-triazine; guanamines such as formoguanamine, acetoguanamine, capryloguanamine, phenylacetoguanamine, benzoguanamine and the like. Mixtures of aminotriazines may further be mentioned.

Many of the above enumerated resins are commercially available products sold under a wide number of trademarks. There may be mentioned Cymel 8670–C and Cymel 405 (American Cyanamid Co.) both commercial melamine-formaldehyde resins.

It is thus apparent that the critical limitations involved with respect to the resin material of the inventive compositions are the following:

(A) The resin must be thermosetting.

(B) The resin must contain basic nitrogen groups which are capable of reacting with the acidic material also contained in the coating composition.

The acidic material

The acidic material in the composition reacts with the basic nitrogen groups in the above described resins. The reaction occurs both in the coating material itself and when applied to the resin impregnated overlay sheet, the acid material reacts with part of the resin which is impregnated, said resin being the same or different as that in the coating and also containing basic nitrogen groups.

Broadly speaking, the acid material may be any acid or poly acid which will react with the resin. As mentioned above the coating composition itself is preferably of relatively high viscosity and more preferably a gel. The purpose of this is two-fold. By having a high viscosity the composition is easily applied and before drying the composition does not tend to penetrate too deeply into the impregnated overlay. Additionally, the coating composition remains on the surface of the overlay and holds the additional resin in place during application, drying and molding, the coating composition may, however, not be of high viscosity.

The production of the relatively high viscosity coating composition may be by a number of ways (e.g. high concentration of ingredients in solvents, thickening agents, etc.). It is preferred, however, to use as the acid material a polycarboxylic acid which is also a thickening agent in the particular solvent used. However, it is clear that one may also use an acid material which is not a thickening agent and add to the coating composition a non-acid additional thickening agent of the conventional type.

Suitable acid materials which function both to create high viscosity and to react with the basic nitrogens in the resin system are poly-methylenecarboxylic acid, polyacrylic acid, polymethacrylic acid, polyacrylic resins, algenic acid, hydrolized polyvinyl acetates, gum arabic, and the like as well as mixtures thereof. A particularly preferred material is "Carbopol" resin (B. F. Goodrich Chemical Company) which is a poly-methylenecarboxylic acid sold in the form of a white, free-flowing powder; bulk density, 13 lb./cu.ft. and a pH of 1% water solution of 3. This material is a very effective gelling agent in water when neutralized.

Optional ingredients

There may be added to the coating composition a number of conventional additives. For example, the coating composition may contain suitable accelerators for the condensation of the resin. One favorable aspect of this invention is that the acid material used acts not only to react with the basic nitrogen containing polymer and to optionally form high viscosity but also as an accelerator for the condensation of the resin material. Thus the addition of conventional accelerators may be dispensed with at substantial cost saving. However, if a fast cure is desired, conventional accelerators may optionally be added. Such accelerators include ammonium chloride or other ammonium salts which liberate acid; bromohydrosuccinic acid, beta chloro (or beta bromo) ethylurea or other organic halogen derivatives which liberate hydrogen halide on heating; phosphoric acid esters; organic amides and imides (e.g. benzoic acid amide, N-benzoyl succinamide, N-propionyl-phthalamide, alphadichlor-hydrin, etc.

It should be mentioned, however, that when no additional accelerator is added the shelf-life of the finished overlay before molding is greatly increased. Since the acid material reacts initially with the basic nitrogen containing polymer there is no acid under shelf-like conditions. However, when the finished overlay is placed under heat and pressure under molding operations some of the complex salt formed is broken up and the acid released thereby creating accelerator material.

An additional optional additive is a volatile base which reacts with the polyacid to form the gel structure. Thus, when using "Carbopol" as the acid and thickening agent, it is required to neutralize the acid in order to form the gel structure. Other thickening agents such as polyacrylic acid, polyacrylic resin, etc., are thickening agents by their very nature and neutralization is not required. Since the resin itself contains basic nitrogen groups, the neutralization when required can be accomplished by the addition of the resin alone. However, in some cases, it may be advisable to add additional base. Suitable bases are alkanol amines (e.g. triethanolamine, diethanolamine, etc.) morpholine, alkylamines (e.g. monoamylamine), etc.

Resin impregnated overlay

The instant invention has application to a wide range of conventional impregnated overlays. The only basic requirement is that the overlay be impregnated with a thermosetting resin which contains basic nitrogen groups. The impregnated overlay which is coated according to the invention is itself well known in the art. Examples of suitable overlays are resin impregnated cellulose, e.g. α-cellulose, rayon, rayon-cellulose mixtures, rice paper, papers made from cotton, linen and similar fibers of vegetable origin, papers made from glass fibers, nylon, polyacrylonitrile, polyesters, etc. Preferably the paper will become transparent in the course of the molding operation; however, it may be translucent if desired.

One aspect of the instant invention is that paper of thinner grade than previously used may be used as the overlay base. Once the overlay has been coated, an entirely new surface has been created on one side of the overlay. This new surface gives added strength and stiffness to the overlay paper and, as such, lower grade paper has been found useful in making overlays according to the invention than was previously considered useful in decorative overlays.

The resin impregnated overlay may be printed with the desired decoration either before or after the inventive coating is applied. In one embodiment, the coated overlay is not decorated but is applied over a decorated, noncoated, impregnated overlay. Since the coating effects only the non-printed side of the overlay, it does not effect the decorative print. Alternatively after the drying of the coating on the impregnated overlay, the finished overlay may then be printed on the non-coated side.

The inks used for printing the decoration on overlay paper are those known to be useful in lithography and fast to heat and formalin vapors, e.g. pigment scarlet, phthalocyamine blue, phthalocyamine green, carbon black, benzidine yellow, etc. Melamine-formaldehyde (or equivalent) resins may be added, if desired, for improving the adhesive characteristics of the ink. It is further understood that the inks may be water-base inks as well as oil-base inks. Here the oil base or alkyd resin of the conventional oils, is replaced by a water-soluble vehicle, preferably one having a solvent or softening action on the resin in the printed sheet.

In the practice of the invention the coating composition which is a gel, is applied to the overlay sheet. The amount of coating is purely optional and is dictated only by the desired finished product. The amount of coating will dictate the eventual scratch resistance, chip resistance, etc., of the finished article. However, depending on the ultimate use of the finished article, the necessity of these properties will vary. Coating weights as low as 1 lb. per ream of overlay paper or as high as 50 lbs. per ream are useful. More preferably coatings of from 3 to 25 lbs. and more specifically 15 lbs. per ream are particularly preferred. If the coating weight becomes too high however, some difficulty may result in that the finished overlay may show a curling tendency.

Once the coating has been applied, the overlay sheet is dried in a suitable oven. The temperature and time of drying is not rendered critical by the application of the inventive coating and is dictated by the apparatus at hand, the desired advancement of the resin in the coating, the coating weight, etc. The drying may occur from room temperature up to about 500° F. The preferred drying temperature is between 100 and 350° F. with the specific temperature about 225° F. The drying time is dependent again on advancement desired, apparatus, coating weight, etc. as well as the temperature used. A further consideration as to the drying times and temperatures is the depth of reaction desired in the overlay paper. The longer the coating remains on the overlay paper the deeper the coating will soak into the paper. It is of course desirous to prevent the coating from soaking entirely through the overlay paper so that one side remains uneffected.

The dried sheet is then printed (if the printing is desired and has not been done prior to coating) to produce the desired decorative effect. The overlay sheet is then used according to conventional methods, that is, the sheet is applied to the molded preform and molded-in and permanently attached to the article in the case of molded articles or incorporated with the preimpregnated paper stock and heat and pressure applied in the case of laminates.

As indicated above, the acid material present in the coating composition actually reacts with the top portion of the resin impregnated in the overlay sheet. When a resin extraction test is performed on the coated impregnated overlay wherein Carbopol and melamine-formaldehyde are used the resin does not completely extract in boiling water. In fact, whereas there was 68% resin present originally, the extraction of the coated product shows only 47.3% removable; and the appearance of the extracted stock is entirely different in that it is more opaque. The tensile runs from 5 to 10 pounds to the inch. In every way it appears that an insoluble compound has been formed during the coating and advancing of the impregnated stocks which is not removable by boiling water.

The most surprising aspect of the situation is that ¼ part of Carbopol had fixed 9 parts of melamine. There is not enough melamine formaldehyde in the coating itself, as will be seen from an inspection of the formula, to satisfy the Carbopol according to the above proportion. So it follows that the coated side of the sheet is affected to a substantial extent—binding into an insoluble in boiling water—to an amount of approximately 6% of the melamine impregnated in the sheet. In other words, applying the surface coating according to the invention results in a modification of the impregnated foil throughout a substantial part of the top portion without affecting the reverse side adversely.

Further work has demonstrated that the compound formed from, for example, Carbopol and melamine is not only insoluble in boiling water, but also infusible under normal conditions for melamine. It is apparent that up to 6% of the total resin in the coated impregnated sheet is thus affected and rendered insoluble. This undoubtedly contributes in a substantial measure to the beneficial effects observed and the invention succeeds in modifying a substantial part of one surface of an impregnated resinous sheet while retaining the original desirable properties of the other side. We do not contend that resinous impregnated sheets have not been coated before, but rather that our treatment results in a modification of a substantial part of one section of the sheet and without affecting the other side.

Carbopol in itself will not flow in molding nor will its combination with melamine; and, therefore, acts in maintaining as well as modifying the molding characteristics of the melamine formaldehyde in its correct position. Whereas other systems depend on the use of highly catalyzed materials; we maintain them in place and retard their flow by chemical reaction and the excellent thixotropic nature of our system, as well as accomplishing a modification of one section of the sheet.

In effect what happens is that the acid material reacts initially with the basic resin in the coating composition when they are first mixed. Upon application to the overlay in turn impregnated with a basic resin and the subsequent drying operation, the acid material further reacts with the basic resin in the overlay. This second reaction occurs during the drying step wherein the solvents are removed, whereas the first reaction occurs initially at room temperature when the reactants are mixed. The reaction of the basic resin and the acid material creates an infusible dispersed solid throughout the top section of the foil which modifies its properties in a very desirable fashion. Further, a part of the coating is retained as a low flow film on the surface of the foil, and the combination of these effects results in the advantages we have cited in an economical manner that is highly desirable.

It is interesting to note that where the base impregnated paper with melamine shows a flow test of 15; this flow can be reduced to any lower value depending on the desired coating weight. This is not as surprising as it seems at first sight. Since the flow test measures the excess resin that flows out, and if a 66% normal resin content shows 15 flow, and if the coating treatment drops the resin extractable position by ⅓ from 68% to 47.1%; then excess resin available to flow in the test is greatly reduced. Normally a single impregnated paper with a flow of 1% will not mold; however, in the case of the coated stock the explanation for its excellent molding qualities lies in the fact that it is not of uniform flow throughout, one side being more flowable than the other side.

If acidic material such as poly-methylenecarboxylic acid or polyacrylic acid resin or polyacrylic acid itself is added in a solution of water to, for example, melamine formaldehyde in water solution, an immediate white insoluble and infusible precipitate is formed. This is resolubilized by the addition of triethanolimine or other amines, and it is believed this precipitate is a salt of the acidic material with the melamine which on addition of further stronger base redissolves but that during the processing is reprecipitated and reacts with a substantial percentage of the melamine formaldehyde in the upper layers of the coated side of the foil modifying its properties in a desirable manner.

It is possible to take the solution of melamine and poly-methylenecarboxylic acid in the right proportions and coat with the finely suspended solid in the presence of additional melamine and eliminate the addition of further amine. This results in a quicker cure of the resin during molding without adversely affecting the shelf-life since the acidic material does not effectively catalyze until heat is applied during molding. In such a case, however, the top section of the foil is not involved to as great a degree as when the extra amine is added and the melamine solution containing the dispersed solid functions more as a top coat. It will be readily seen that thru employment of cost. It will be readily seen that through employment of the proper procedure the most desirable effects can be obtained depending on the required results.

Using different amounts of poly-methylenecarboxylic acid for instance in the coating formulation, it is found that the weight of the insoluble white precipitate varies up to a certain amount.

For instance, using 2.5 pts. of Carbopol 934 to 100 pts. of melamine the weight of the ppt. is 6.5 pts. by weight, when washed free of melamine with hot water. When the amount is doubled the weight of the ppt. increases to 26 pts. of precipitate, a further doubling of the Carbopol fails to increase the weight of precipitate showing this is not strictly a quantitative reaction.

The pH's of the various solutions is interesting, and we find as follows:

A. Carbopol 934 in 2.5% of solution=pH 3-4
B. Cymel 405 (melamine-formaldehyde) in 50% solution=pH 8
C. After mixing A and B=pH 6
D. The filtrate shows=pH 6.5

It is interesting that the mixture of melamine resin and Carbopol in presence of the insoluble (as determined by solubility tests) white precipitate shows a neutralization with the pH on the acid side. However, though the insoluble neutralization product cannot be dissolved in boiling water to an appreciable amount the filtrate shows a value close to neutrality but slightly on the acid side which shows the Carbopol and melamine do not react completely to form a completely insoluble product leaving free melamine in the solution. This has to be evaluated against the fact that the white precipitate formed appears completely insoluble in boiling water. The reaction between the acidic Carbopol and the melamine is apparently not a case of a simple addition product since the use of a stronger Carbopol solution does not precipitate more melamine beyond a certain point. This is in line with the pH of the filtrate being slightly acid and not basic as the case with the melamine solution (pH 8).

The inventive coating can be used to produce a wide variety of decorated molded and laminated materials. Thus, dinnerware, knobs, dials, signs, wall tile, light switch plates, table tops, bottle caps, etc., can be decorated according to the present invention.

Generally speaking, the proportions of the basic polymer and the acidic material can vary within broad ranges. It is generally required that sufficient acid material be employed such that after reacting initially with the basic resin contained in the coating, sufficient acid material remains to react with the basic resin in the overlay paper. The proportions of the basic polymer and acidic material further vary depending on whether or not added base and catalyst is included or whether the acid material itself functions as the catalyst and the basic polymer as the neutralizing base. A large excess acidic material over the basic polymer is not detrimental but serves no economical purpose. The proportions of acid material to base containing polymer may vary broadly from 1 to 0.5 to 1 to 100 and more preferably from 1 to 1.5 to 1 to 50 parts acid material to basic polymer, the proportions being on a weight basis.

Suitable illustrative proportions using the polymethylenecarboxylic acid and melamine-formaldehyde, for example, are from 0.5 to 1 part of acid to .5 to 30 parts of polymer and preferably .125 to .50 part acid to 1 to 20 parts polymer.

The overlay paper once decorated, coated and dried is then useful in the production of decorated articles according to molding and laminating procedures conventional in the art. Thus when a molded article is to be produced, the resin is placed in a mold, formed into a preform by the application of heat and pressure, opened, the decorated, coated, overlay paper is placed over the preform, the mold is closed, heat and pressure are applied and the finished article is produced. When a laminated article is desired, a series of sheets are impregnated with resin, the decorated coated overlay is inserted on a stack of impregnated sheets and the entire stack is pressed under heat and pressure to produce the desired laminate. An alternative procedure when forming molded and laminated articles is to place an uncoated, decorated and impregnated sheet on the preform or stack of pre-impregnated sheets. On top of this sheet is placed a clear, undecorated impregnated sheet which has been coated according to the invention but which contains no decoration. Upon application of heat and pressure, the desired article or laminate is formed. The uppermost sheet which has been coated according to the invention becomes transparent during the application of heat and pressure and allows the decorated sheet below it to show through. This modification allows the use of lighter grade paper while maintaining an excellent scratch, chip and stain resistance in the finished article.

The following examples are presented to further illustrate the invention and do not constitute express or implied limitations.

Example I

A solution of 10 lbs. water and .25 lb. of polymethylenecarboxylic acid (dry weight—"Carbopol 934") is prepared. To this solution there is added 5 lbs. water and 5 lbs. of melamine-formaldehyde resin (dry weight—"Cymel 405"). The resulting mixture is stirred and .15 lb. triethanolamine and .15 lb. of catalyst is added. The resulting mixture is thixotropic gel which can be applied as the inventive coating of the invention. This finished coating mixture may be further diluted with water to facilitate coating techniques.

The triethanolamine in the above composition acts to neutralize the Carbopol initially and create the thixotropic system.

Example II

The composition of Example I is prepared with the exception that no catalyst or triethanolamine is added. In this composition, therefore, the Carbopol acts as the catalyst while the melamine-formaldehyde acts as the triethanolamine.

Example III

The composition of Example I is prepared with the exception that polyacrylic acid is substituted in place of the poly-methylenecarboxylic acid. The thixotropic gel composition results which is further diluted with water to form the finished coating composition.

Example IV

.25 lb. of polyacrylic acid (dry weight—"Polyacrylic Acid K 702," B. F. Goodrich Company) is mixed with 4.75 lbs. water. This mixture is added to 5 lbs. water and 5 lbs. melamine-formaldehyde resin (dry weight. .2 lb. of triethanolamine is added and the resulting mixture is stirred. A thixotropic gel system results which is useful as the coating composition of the instant invention. In this example the polyacrylic acid functions as the catalyst during the subsequent molding operations.

Example V

The composition of Example IV is prepared with the exception that an equal amount of urea-formaldehyde resin is substituted for the melamine-formaldehyde resin.

Example VI 10 lbs. polyacrylic acid is mixed with 100 lbs. water. To this is added 15 lbs. of melamine-formaldehyde resin and the resulting mixture is stirred. A thixotropic gel composition results which is useful as the coating composition of the present invention.

Example VII

The composition of Example VI is prepared with the exception that an equal amount of urea-formaldehyde resin is substituted in place of the melamine-formaldehyde resin.

Example VIII

Further compositions useful as coating compositions are prepared by mixing the following ingredients:

| Ingredients* | A | B | C | D |
|---|---|---|---|---|
| Melamine-formaldehyde resin | 1 | 20 | 15 | |
| Urea-formaldehyde resin | | | | 4 |
| Water | 15 | 10 | 100 | 5 |
| Triethanolamine | | | | .2 |
| Poly-methylenecarboxylic acid | .125 | .50 | | |
| Polyacrylic acid | | | 10 | .25 |

*The amounts of ingredients are expressed in pounds.

Example IX

The coating composition of Example I is applied to an already decorated α-cellulose-rayon mixed paper which has previously been impregnated with melamine-formaldehyde resin (commercially available under the trademark "Hurlbut Rayon 900"). The coating weight used in approximately 15 lbs./ream of paper. The coated paper is dried at a temperature of 225° F. for about three minutes. The resulting paper is now useful as a decorative overlay in molded or laminated products.

Example X

The coating composition of Example III is applied to the paper described above to effect a coating weight of 3 lbs./ream of paper. The paper is dried at 200° F. for 10 minutes.

Example XI

The coating compositons of Examples IV, V, VI, VII and VIII A and B are applied in the manner of Example IX. The coating weight is varied between 3 to 15 lbs./ream and the temperature of drying is varied between 100 and 350° F. The coated paper produced is useful as decorative overlays according to the present invention.

Example XII

Ten inch dinnerplates are molded by first placing 310 grams of melamine-formaldehyde molding powder in a female mold. A preform is produced by closing the mold for about 30 seconds at a pressure of about 3000 p.s.i. and a temperature of approximately 310° F. The mold is opened and the coated decorated overlay of Example IX is placed coated side up on top of the preform. The mold is again closed for about 2 minutes at the same temperature and pressure. A good molded plate is produced with no breaks or distortion. The plate shows excellent whiteness and gloss. Subsequent testing shows unusually high scratch and chip resistance and substantially no tendency to stain.

Example XIII

The bottom of a female mold is filled with melamine-formaldehyde resin. A preform is produced by closing the mold at 325° F. for about 30 seconds at a pressure of 3000 p.s.i. The coated decorated overlay produced by coating an α-cellulose-rayon mixed paper with the coating of Example IV to a coating weight of 15 lbs./ream of paper (decoration applied prior to coating) is inserted with the decorated side down. The mold is closed and additional pressure is exerted for 1½ minutes. The finished article shows exceptional gloss and resistance to scratching, chipping and staining.

Example XIV

A series of paper sheets are impregnated by melamine-formaldehyde and dried. The impregnated papers are placed one atop the other in a press. The decorated overlay paper according to Example IX is placed on top of the impregnated paper and the entire stack of paper is pressed at about 1200 p.s.i. at a temperature of 140° C. for about 30 minutes. The decorated laminate produced shows exceptional gloss and is highly scratch and chip resistant.

Example XV

A series of impregnated sheets as used in Example XIV above are placed in a press. A decorated overlay which has been impregnated with melamine-formaldehyde is placed on top of the impregnated sheets. This decorated overlay is not coated according to the invention. On top of the decorated sheet is placed the undecorated overlay of Example IX. The entire stock is pressed at 1150 p.s.i. and 150° C. for 30 minutes. The decorated laminate produced is comparable with that of Example XIV above.

We claim:
1. An overlay for forming decoated molded thermosetting resin articles and laminates having a resin rich surface, said overlay comprising a fibrous sheet impregnated with a thermosetting resin containing basic nitrogen groups capable of reacting with an acid, one surface of said sheet being coated with a coating composition comprising
    (a) a thermosetting resin containing basic nitrogen groups and
    (b) an organic polycarboxylic acid said acid having reacted with at least the thermosetting resin impregnated in said sheet at the coated surface, the surface of such sheet not coated with the composition being substantially non-reacted with said acid.
2. The overlay according to claim 1 wherein the thermosetting resin impregnated in the fibrous sheet and the thermosetting resin in the coating composition are the same or different and are selected from the group consisting of aldehydeaminotriazine condensation products, aldehyde-thiourea condensation products, amino substituted phenol-aldehyde resins, amino substituted styrene resins and mixtures thereof.
3. The overlay according to claim 1 wherein the acid is a member selected from the group consisting of polymethylene carboxylic acid, polyacrylic acid, polymethacrylic acid, algenic acid, hydrolized polyvinyl acetate, gum arabic and mixtures thereof.
4. The overlay according to claim 3 wherein the coating composition has a weight ratio of acid to resin of from 1 to 1.5 to 1 to 50.
5. The overlay according to claim 4 wherein the acid is a polymethylene carboxylic acid and the resin impregnated in the fibrous sheet and contained in the coating composition is a member selected from the group consisting of aldehyde-aminotriazine condensation products and aldehyde-urea condensation products.
6. In the process for producing decorated, molded thermosetting resin articles and laminates comprising contacting an overlay with thermosetting resin and applying heat and pressure thereto to bond the overlay and thermosetting resin, the improvement comprising employing as the overlay the overlay according to claim 1, said overlay having its non-coated surface contacted with the thermosetting resin.
7. A decorated thermosetting resin molded article or laminate produced by the process of claim 6.

References Cited
UNITED STATES PATENTS

| | | | |
|---|---|---|---|
| 2,486,201 | 10/1949 | Patterson | 260—45.3 |
| 3,131,116 | 4/1964 | Pounds | 161—258 |
| 3,033,811 | 5/1962 | Brown et al. | 260—856 X |
| 3,117,053 | 1/1964 | Lawrence et al. | 161—146 |
| 3,194,723 | 7/1965 | Grudus et al. | 161—156 |

JACOB H. STEINBERG, *Primary Examiner.*